US007796061B2

(12) United States Patent
Kee

(10) Patent No.: US 7,796,061 B2
(45) Date of Patent: Sep. 14, 2010

(54) DISTRIBUTED DECODING DEVICE USING MULTI-CORE PROCESSOR AND METHOD FOR THE SAME

(75) Inventor: Chang-Seo Kee, Yongin (KR)

(73) Assignees: DVICO Inc., Gyeonggi-do (KR); Do-Hyoung Kim, Gyeonggi-do (KR)

( * ) Notice: Subject to any disclaimer, the term of this patent is extended or adjusted under 35 U.S.C. 154(b) by 178 days.

(21) Appl. No.: 12/136,989

(22) Filed: Jun. 11, 2008

(65) Prior Publication Data

US 2008/0310555 A1 Dec. 18, 2008

(30) Foreign Application Priority Data

Jun. 15, 2007 (KR) .................. 10-2007-0058669

(51) Int. Cl.
*H03M 7/00* (2006.01)
(52) U.S. Cl. .......................................... 341/95; 341/50
(58) Field of Classification Search .................. 341/50, 341/51, 95; 375/E7.015, E7.093, E7.103, 375/E7.211
See application file for complete search history.

(56) References Cited

U.S. PATENT DOCUMENTS 5,532,744 A * 7/1996 Akiwumi-Assani et al. ...... 348/390.1
7,292,772 B2 * 11/2007 Ueda .......................... 386/52
7,627,039 B2 * 12/2009 Lillevold ................ 375/240.25

FOREIGN PATENT DOCUMENTS

EP 1770509 4/2007

OTHER PUBLICATIONS

Suchendra M. Bhandarkar et al., "Parallel Parsing of MPEG Video in a Multi-threaded Multiprocessor Environment," Department of Computer Science, The University of Georgia, IPDPS 2000 Workshop.

* cited by examiner

*Primary Examiner*—Brian Young
(74) *Attorney, Agent, or Firm*—Greenblum & Bernstein, P.L.C.

(57) ABSTRACT

Provided is a distributed decoding device using a multi-core processor, including a multi-core processor that includes a plurality of cores which process data as threads; an MPEG division module that receives MPEG data, extracts decoding information from the MPEG data, divides the MPEG data into individual slices, and generates and provides a single-slice decoding function, which separately decodes one slice, such that threads which decode the divided slices allocated thereto are distributed to the cores within the multi-core processor; a memory that includes a plurality of buffers which receive the slices from the MPEG data division module to store therein and provide the stored slices to the cores of the multi-core processor; and a merging module that merges the data decoded through the cores of the multi-core processor.

8 Claims, 4 Drawing Sheets

DISTRIBUTED DECODING DEVICE USING MULTI-CORE PROCESSOR AND METHOD FOR THE SAME

CROSS-REFERENCE TO RELATED APPLICATIONS

This application claims the benefit of Korean Patent Application No. 10-2007-0058669 filed with the Korea Intellectual Property Office on Jun. 15, 2007, the disclosure of which is incorporated herein by reference.

BACKGROUND OF THE INVENTION

1. Field of the Invention

The present invention relates to a distributed decoding device using a multi-core processor and a method for the same. In the present invention, a bit-stream of MPEG data is divided into a plurality of slices, so that the decoding processing for each slice is distributed to multiple cores as threads such that the slices are separately and independently decoded, and then the decoded data is merged.

2. Description of the Related Art

In general, a multi-core processor means an integrated circuit having two or more Central Processing Units (CPUs) mounted therein. Because increasing the operation frequency of a single CPU reaches a limit, multi-core processor is widely used where two or more CPUs cooperate so as to overcome the limit in frequency.

The processing unit of the multi-core processor is a thread. The multi-core processor disposes threads into a CPU having smaller computing load.

The MPEG decoding algorithm in the prior art assumes that a single CPU operates to perform decoding. Therefore, even when MPEG data is decoded by the multi-core processor, an overall MPEG decoding thread is disposed into a CPU. That is, when a dual-processor using two CPUs or a quad-processor using four CPUs decodes MPEG data through the existing MPEG decoding algorithm, computing load is concentrated on one CPU. Then, computation load of the multiple CPUs are non-uniformly maintained.

As such, multiple cores of a multi-core processor are not uniformly utilized when processing a large computing load, i.e. MPEG decoding.

SUMMARY OF THE INVENTION

An object of the present invention is to provide a distributed decoding technology using a multi-core processor which can properly distribute a decoding processing to a plurality of cores of a multi-core processor such that computing power of each core can be effectively utilized.

Another object of the present invention is to provide a distributed decoding technology which can effectively divide the decoding processing of MPEG data into a plurality of decoding threads for the plurality of cores.

BRIEF DESCRIPTION OF THE DRAWINGS

These and/or other aspects and advantages of the present general inventive concept will become apparent and more readily appreciated from the following description of the embodiments, taken in conjunction with the accompanying drawings of which.

DETAILED DESCRIPTION OF THE PREFERRED EMBODIMENTS

Figure 1:
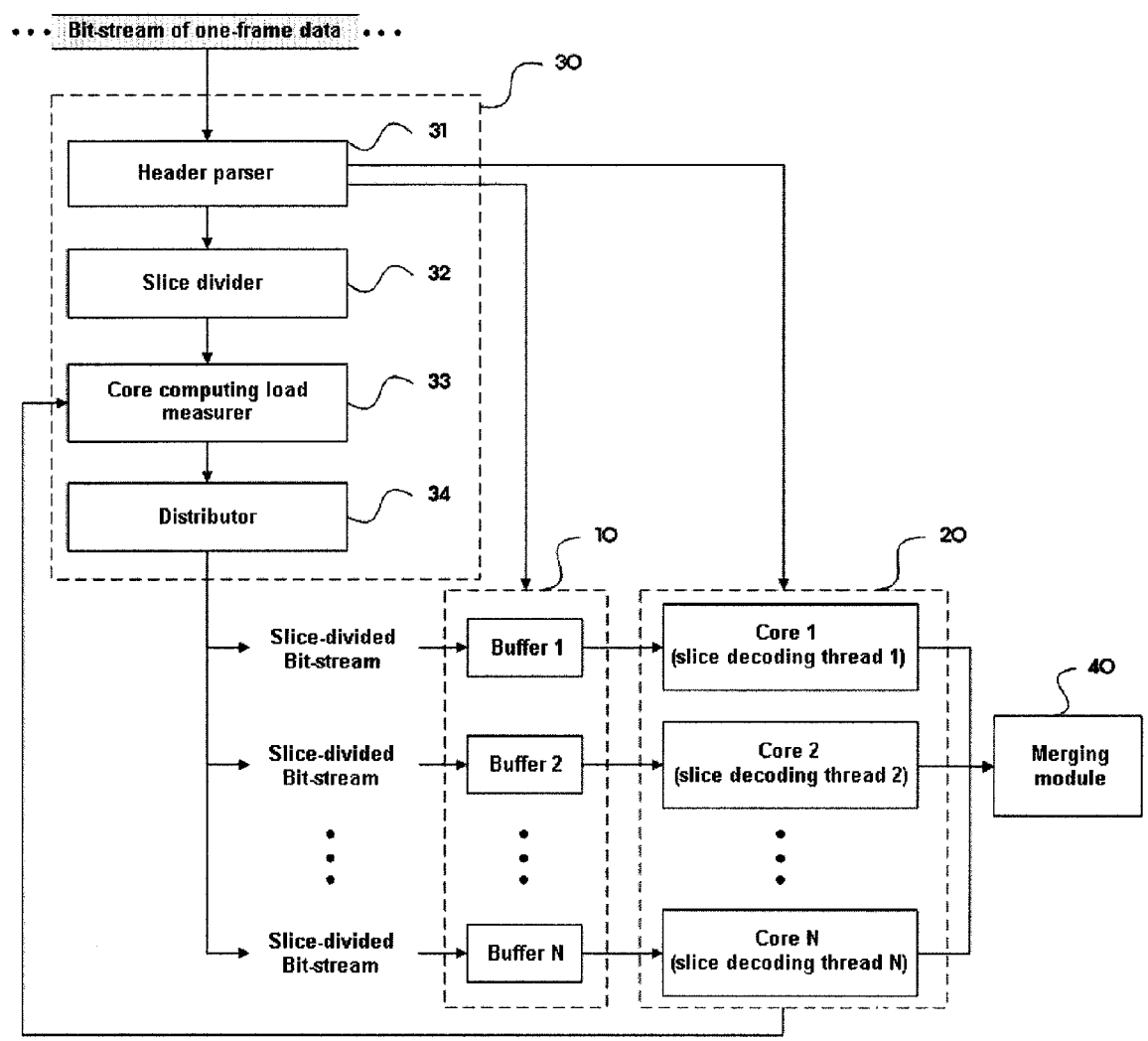
FIG. 1 is a block diagram of a distributed decoding device using a multi-core processor according to an embodiment of the invention.

Reference will now be made in detail to the embodiments of the present general inventive concept, examples of which are illustrated in the accompanying drawings, wherein like reference numerals refer to like elements throughout. The embodiments are described below in order to explain the present general inventive concept by referring to the figures. In the drawings, the thicknesses of layers and regions are exaggerated for clarity.

Hereinafter, preferred embodiments of the present invention will be described in detail with reference to the accompanying drawings.

FIG. 1 is a block diagram of a distributed decoding device using a multi-core processor according to an embodiment of the invention. The distributed decoding device includes a multi-core processor 20, a memory 10, an MPEG division module 30, and a merging module 40.

The basic concept of the invention is that one-frame data of MPEG bit-stream is stored in the memory 10 and are allocated as threads to multiple cores within the multi-core processor 20 so that the one-frame data is merged after multiple decoding. Because slices of MPEG data are independently encoded from each other, the slices may be separately and independently decoded and then merged.

The multi-core processor 20 includes a plurality of cores (CPUs) whose processing is managed by threads. Each core operates independently.

The memory 10 includes a plurality of buffers which store slices provided from the MPEG division module 30, and provides the stored slices to the cores.

The MPEG data division module 30, when receiving MPEG data, extracts decoding information and divides the MPEG data into slices, and distributes the decoding process for each slice to the cores as threads. The slice are stored in the buffers of the memory 10 and then provided to the corresponding cores. The MPEG division module 30 includes a header parser 31, a slice divider 32, and a distributor 34, and may further include a core computing load measurer 33 and a single-slice decoding function generator.

The header parser 31 receives MPEG bit-stream and perform header parsing, e.g., decoding information extraction. Further, the header parser 31 divides the memory 10 so as to prepare the buffers for the slices. That is, the memory 10 is divided into a plurality of buffers so as to correspond to the cores of the multi-core processor 20.

The slice divider 32 detects slice start codes within the bit-stream and divides the bit-stream into individual slices.

The distributor 34 distributes the slice-divided bit-streams into the buffers. The bit-streams may be distributed to the cores uniformly or inversely-proportional to each computing load (the computing load of each core). In the latter case, the core computing load measurer 33 additionally included, which measures the computing load of each core within the multi-core processor 20. In the former case, the computing load may not be considered and the slices are uniformly distributed into cores, which render the distributor 34 simple.

The slice-divided bit-streams are distributed into the buffers of the memory 10 by the distributor 34. Each buffer allocates a slice decoding thread to the corresponding core, and each core receives data from the corresponding buffer so as to process its slice decoding thread.

The function for decoding the slice in a core is slightly different from a prior art decoding function. Because a prior art decoding function is mainly for a bulky MPEG data, a decoding function for decoding slices should be defined. Therefore, the MPEG division module 30 may further include a single-slice decoding generator, which generates a single-slice decoding function for separately decoding the slices using the decoding information, and then provides the single-slice decoding function to the cores.

The merging module 40 merges the outputs from the decoding threads of the cores. As a result, the entire MPEG bit-stream is decoded.

Figure 2:
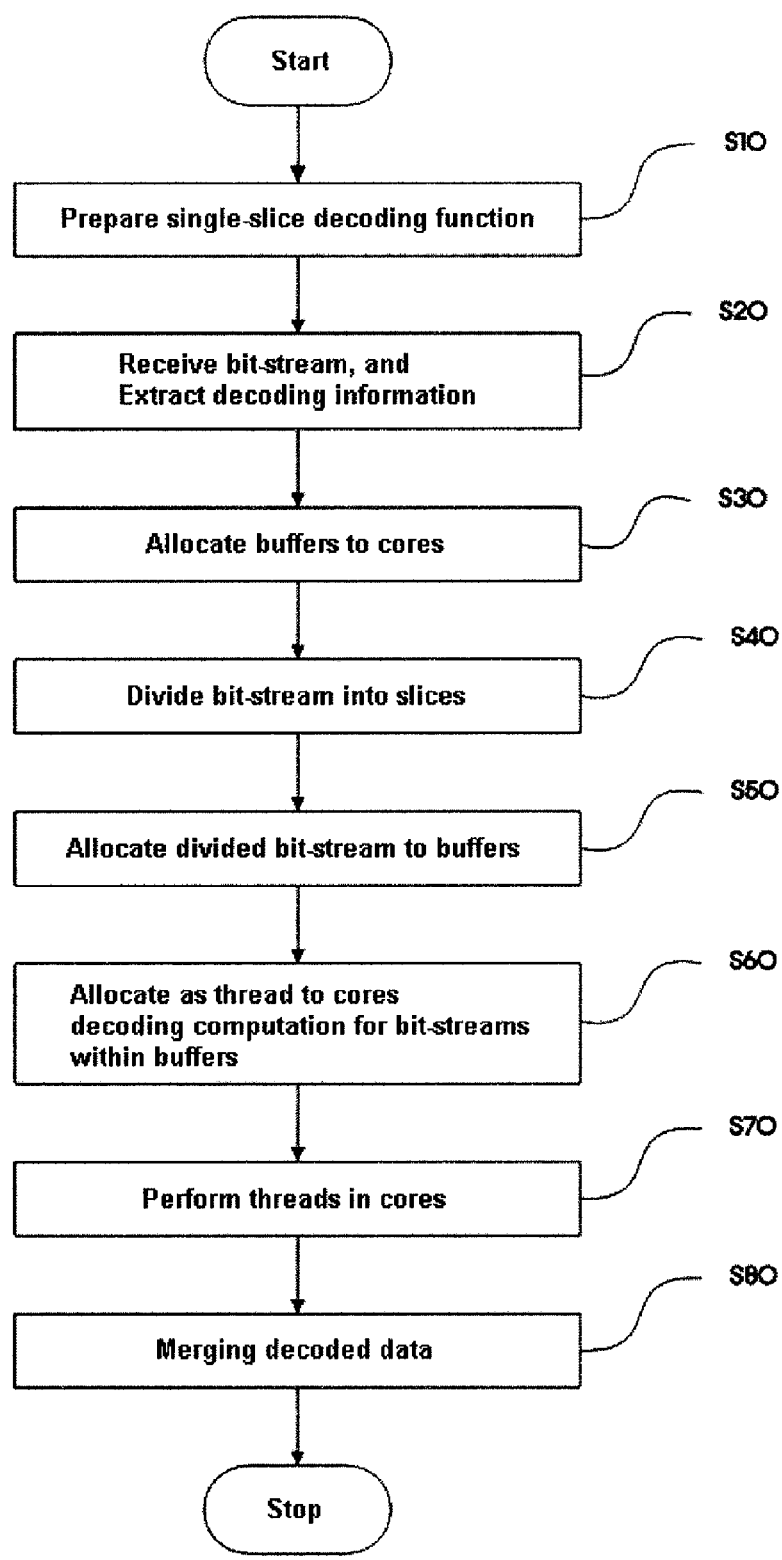
FIG. 2 is a flow chart showing a distributed decoding method using a multi-core processor according to an embodiment of the invention.

FIG. 2 is a flow chart showing a distributed decoding method using a multi-core processor according to an embodiment of the invention.

In step S10, there is prepared a single-slice decoding function, which separately decodes the slices of MPEG data.

In step S20, MPEG bit-stream is received and its decoding information is extracted. By reading a picture header in MPEG data, a screen size or basic decoding information can be obtained.

In step S30, the memory 10 is divided into a plurality of regions corresponding to the number of the cores of the processor 20, thereby preparing a plurality of buffers corresponding to the cores. The buffers are allocated to the corresponding cores, so that data through a buffer is provided to its corresponding core.

In step 40, the MPEG bit-stream is divided into slices. By detecting 'slice start' codes in the bit-stream, the slices can be identified.

In step S50, the slice-divided bit-stream is allocated and provided to the buffers corresponding to the cores. Depending on how the slice-divided bit-stream is distributed, a computing load of each core may differ and time difference between core outputs may occur. Computing loads for decoding one macroblock are similar in MPEG technology, regardless of inter-coded or intra-coded macroblocks. Therefore, computing loads for decoding one slice is similar each other. Further, each slice is encoded independently from each other. Therefore, assuming that the computing load of each core is similar, it is preferable that the slice-divided bit-streams are uniformly allocated to the buffers so as to be sequentially provided to the decoding. Alternatively, the slice-divided bit-streams may be distributed inversely-proportional to computing load after checking each core's computing load. In this case, the load of each core can be effectively maintained uniformly, and the decoding thread termination time of each core can be substantially equalized.

In step S60, the decoding computations for the slice input are allocated as threads to the corresponding cores. In step S70, each core processes the decoding thread for the slice provided through the corresponding buffer by using the prepared single-slice decoding function. In step S80, after the decoding threads of all the cores are terminated, the data output from the cores are merged.

Figure 3:
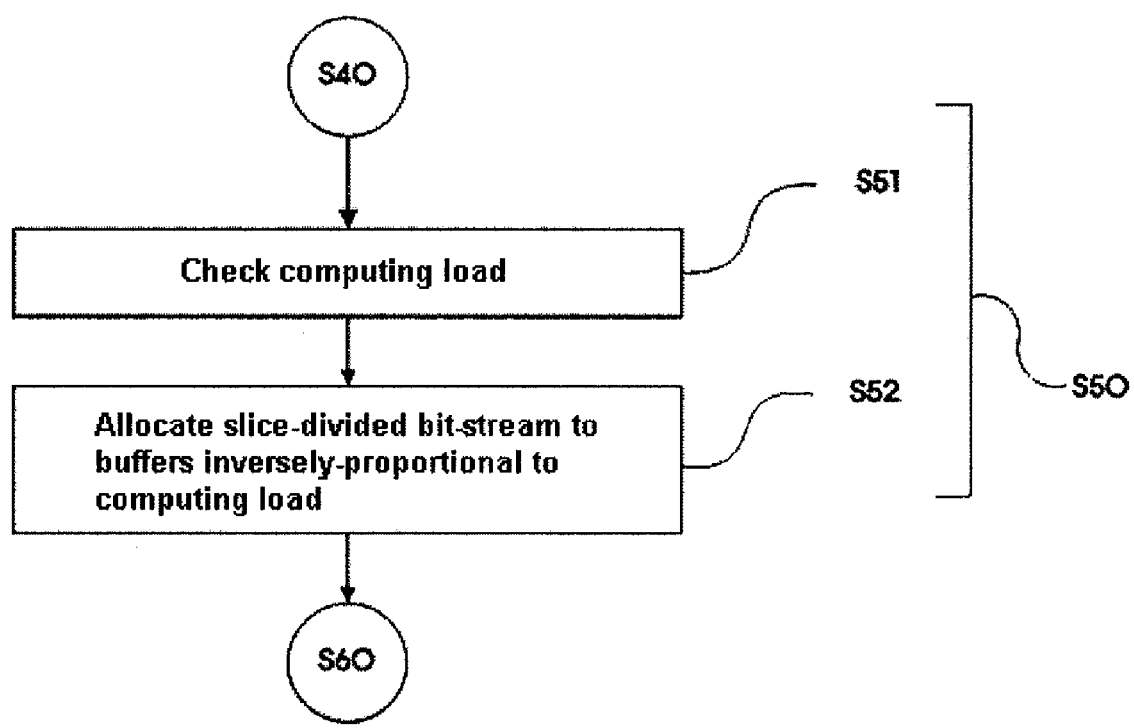
FIG. 3 is a flow chart showing in detail a step of dividing bit-streams by the slice and then distributing the divided ones to buffers for the cores.

FIG. 3 is a flow chart showing step S50 in detail, where the bit-streams divided by the slice are distributed to the buffers allocated to the cores.

In step S51, the computing load of the cores is checked.

In step S52, the slice-divided bit-streams are allocated inversely-proportional to the computing load of the cores, and then are provided to the buffers. In particular, when the computing load of the cores much differs from each another, it is preferable in view of resource utilization to distribute the slices inversely-proportional to computing load. That is, fewer threads are allocated to busier cores. Alternatively, slices may be uniformly allocated to the buffers. Assuming that computing load of the cores is uniform, because there is little difference in computing load for the slices, thread allocations are uniformly maintained, although the slices are uniformly allocated. In this embodiment, core's computing load does not need to be checked, which renders its constitution simple.

Figure 4:
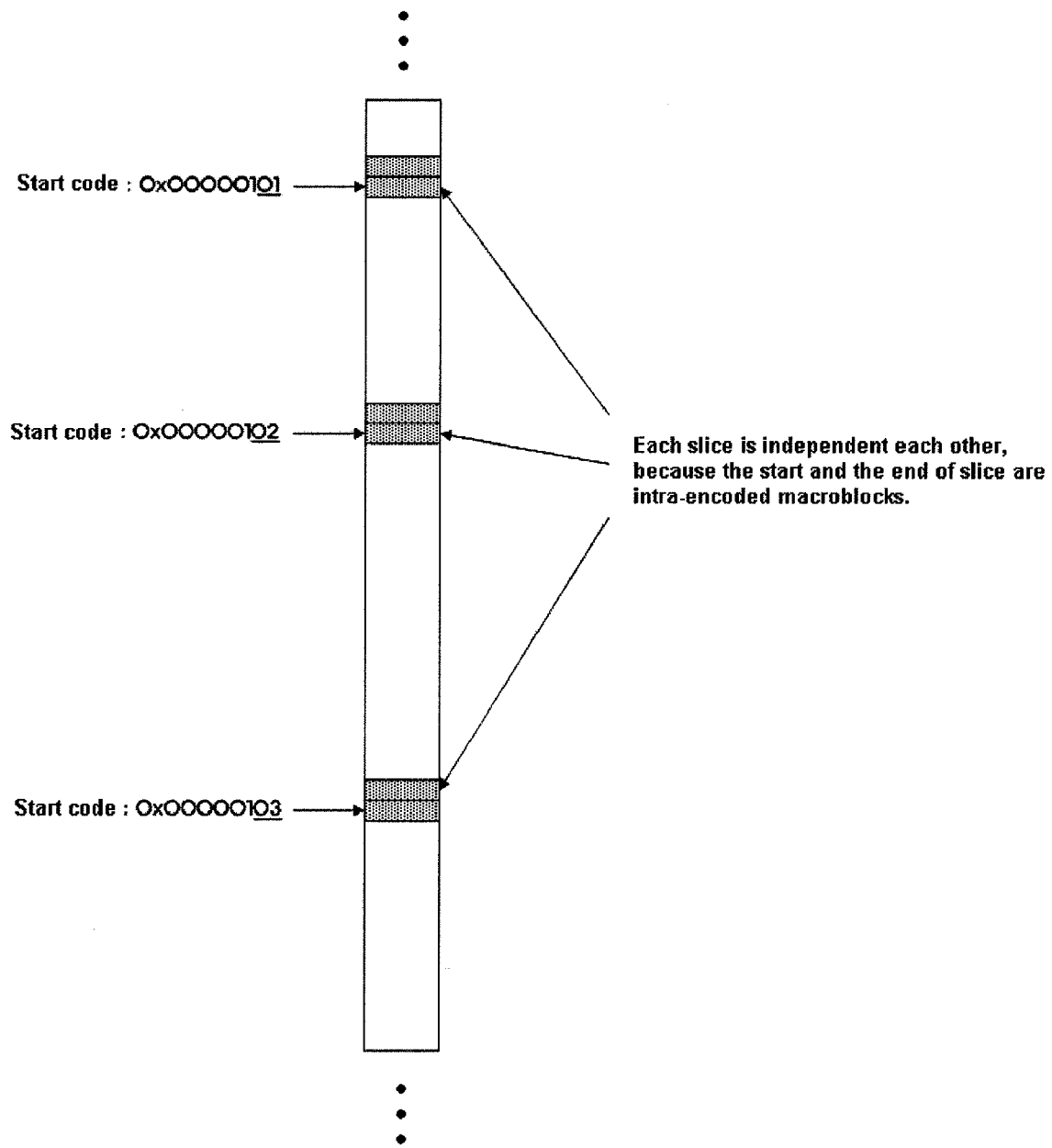
FIG. 4 is a diagram showing the structure of slices within a bit-stream of MPEG data.

FIG. 4 is a diagram showing the structure of slices within the bit-stream of the MPEG data.

MPEG data includes six layers, i.e., sequence, GOP (group of picture), picture, slice, macroblock, and block. Each unit is marked by 'start code' so that its position may be identified from outside. The start code of the slice is 00 00 01 xx. Therefore, slices may be collected because N slices may be identified, i.e., 0x00000101, 0x00000102, 0x0000010, etc.

Further, each slice is independent each other without any continuity, because the start and the end of a slice are intra-encoded macroblocks. That is, each slice is independently encoded. Therefore, although the bit-stream is divided by the slice and each slice is separately decoded, the output data is not damaged.

According to the invention, the decoding processing for the MPEG data can be divided into a plurality of threads, without a complicated computation. Therefore, when such a processing with a large computing load as MPEG decoding is processed, the concentration of computing load in a CPU within the multi-core processor can be prevented. As a result, it is possible to effectively utilize the plurality of CPUs within the multi-core processor.

Although a few embodiments of the present general inventive concept have been shown and described, it will be appreciated by those skilled in the art that changes may be made in these embodiments without departing from the principles and spirit of the general inventive concept, the scope of which is defined in the appended claims and their equivalents.

What is claimed is:

1. A distributed decoding device using a multi-core processor, comprising:

a multi-core processor that includes a plurality of cores;

a divider that receives an encoded data, extracts decoding information from the encoded data, divides the encoded data into slices, and generates and provides a single-slice decoding function, wherein the decoding function separately decodes one slice, such that threads for decoding the divided slices allocated thereto are distributed to the plurality of cores within the multi-core processor;

a memory that includes a plurality of buffers which receive the slices from the divider to store therein and provides the stored slices to the plurality of cores of the multi-core processor; and a merger that merges the output data from the plurality of cores so as to produce the decoded data for the encoded data.

2. The distributed decoding device according to claim 1, wherein the divider includes:

a header parser that receives the encoded data, extracts decoding information from the encoded data, and divides the memory into a plurality of buffers corresponding to the plurality of cores of the multi-core processor;

a slice divider that detects slice start codes within the encoded data so as to divide the encoded data into a plurality of slices;

a distributor that allocates the slices into the buffers; and a single-slice decoding generator that generates a single-slice decoding function for separately decoding one slice and provides the single-slice decoding function to the plurality of cores of the multi-core processor.

3. The distributed decoding device according to claim 2, wherein the distributor uniformly distributes the slice-divided encoded data to the buffers of the cores such that the encoded data are sequentially provided to the corresponding plurality of cores.

4. The distributed decoding device according to claim 2, wherein the divider further includes a core computing load measurer for checking computing load of the plurality of cores, and the distributor allocates the slice-divided encoded data to the corresponding buffers of the plurality of cores such that the slices are provided to the buffers inversely-proportional to the computing load of the corresponding plurality of cores.

5. A distributed decoding method using a multi-core processor, comprising:

preparing a single-slice decoding function which separately decodes slices within a predetermined type of encoded data;

receiving encoded data, and extracting decoding information from the received encoded data;

dividing a memory into a plurality of regions corresponding to a plurality of cores of the multi-core processor such that a plurality of buffers corresponding to the plurality of cores are prepared and allocated to the plurality of cores;

dividing the encoded data into a plurality of slices;

allocating the slices to the buffers;

allocating the decoding computations for the slices, which slices are input to the buffers, to the corresponding cores as threads;

performing, at the plurality of cores, the decoding threads using the single-slice decoding function; and merging the output data out of the plurality of cores so as to produce the decoded data for the encoded data, when the threads of the plurality of cores terminates.

6. The distributed decoding method according to claim 5, wherein dividing the encoded data into the plurality of slices includes detecting slice start codes within the encoded data so as to identify slices.

7. The distributed decoding method according to claim 6, wherein allocating the slices to the buffers includes:

checking computing load of the plurality of cores; and allocating the slices to the corresponding buffers of the plurality of cores such that the slice allocation is inversely-proportional to the computing load of the plurality of cores.

8. The distributed decoding method according to claim 6, wherein allocating the slices to the buffers includes uniformly allocating the slices to the corresponding buffers of the plurality of cores.

* * * * *